United States Patent [19]

Ostersetzer et al.

[11] Patent Number: 5,373,707

[45] Date of Patent: Dec. 20, 1994

[54] AIR CONDITIONING SYSTEM

[75] Inventors: Shlomo Ostersetzer, Ramat Chen; David Lior, Herzliya, both of Israel

[73] Assignee: TAT Aero Equipment Industries Ltd., Tel Aviv, Israel

[21] Appl. No.: 980,950

[22] Filed: Nov. 25, 1992

[30] Foreign Application Priority Data

Nov. 27, 1991 [IL] Israel ........................................ 100172

[51] Int. Cl.5 .................................................. F25D 9/00
[52] U.S. Cl. ................................................ 62/401; 62/88; 62/402
[58] Field of Search ............................. 62/88, 401, 402

[56] References Cited

U.S. PATENT DOCUMENTS

| | | | |
|---|---|---|---|
| 2,453,923 | 11/1948 | Mayo ........................ | 62/402 X |
| 2,557,099 | 6/1951 | Green ........................ | 62/402 |
| 2,930,205 | 3/1960 | Walker ...................... | 62/402 X |
| 2,959,029 | 11/1960 | Best .......................... | 62/402 |
| 3,080,728 | 3/1963 | Groves et al. .............. | 62/401 X |
| 3,369,777 | 2/1968 | Furlong ..................... | 62/402 |
| 4,015,438 | 4/1977 | Kinsell et al. .............. | 62/88 |
| 4,018,060 | 4/1977 | Kinseil et al. .............. | 62/91 |
| 4,550,573 | 11/1985 | Rannenberg ............... | 62/401 X |
| 4,875,345 | 10/1989 | Signoret .................... | 62/402 |
| 5,121,610 | 6/1992 | Atkinson et al. ........... | 62/402 X |

FOREIGN PATENT DOCUMENTS

| | | | |
|---|---|---|---|
| 3824468 | 1/1990 | Germany ................... | 62/402 |
| 256596 | 10/1990 | Japan ........................ | 62/401 |
| 928687 | 6/1963 | United Kingdom . | |
| 1103056 | 7/1984 | U.S.S.R. .................... | 62/401 |
| 1592676 | 9/1990 | U.S.S.R. .................... | 62/401 |

*Primary Examiner*—Henry A. Bennett
*Assistant Examiner*—C. Kilner
*Attorney, Agent, or Firm*—Cushman, Darby & Cushman

[57] ABSTRACT

An air cycle air conditioning system including an air-air heat exchanger defining a first air flow path for air to be cooled and a second air flow path for air to pass therethrough and absorb heat from the air to be cooled and apparatus for supplying air to the second air flow path at sub-atmospheric pressure.

4 Claims, 2 Drawing Sheets

AIR CONDITIONING SYSTEM

FIELD OF THE INVENTION

The present invention relates to air cycle air conditioning systems and methods generally.

BACKGROUND OF THE INVENTION

The use of air cycle air conditioning systems as opposed to vapor cycle systems has become increasingly attractive due to growing environmentalist concern about the depletion of the earth's ozone layer resulting, inter alia, from release of fluorocarbons, which are used in vapor cycle systems.

One type of air cycle air conditioning system is described in U.S. Pat. No. 4,015,438 and employs inlet air at substantially ambient pressure which is cooled in a heat exchanger and introduced into an enclosure for cooling.

SUMMARY OF THE INVENTION

The present invention seeks to provide an improved air cycle air conditioning system and method which is significantly more energy efficient than prior art systems and which therefore may be employed, inter alia, for aircraft applications.

There is thus provided in accordance with a preferred embodiment of the present invention an air cycle air conditioning system including an air-air heat exchanger defining a first air flow path for air to be cooled and a second air flow path for air to pass therethrough and absorb heat from the air to be cooled and apparatus for supplying air to the second air flow path at sub-atmospheric pressure.

Additionally in accordance with a preferred embodiment of the present invention there is provided an air cycle air conditioning system including precooler apparatus for cooling pressurized air, apparatus downstream of the precooler for reducing the pressure of the pressurized air, turbine apparatus receiving the pressurized air, for being driven thereby and providing expansion thereof, thus lowering the temperature thereof, an air-air heat exchanger defining a first air flow path for air to be cooled and a second air flow path for the air at sub-atmospheric pressure to pass therethrough and absorb heat from the air to be cooled and compressor apparatus, at least partially driven by the turbine apparatus, for drawing air at said sub-atmospheric pressure through the second flow path.

Further in accordance with a preferred embodiment of the present invention there is provided an aircraft air cycle air conditioning system including apparatus for receiving bleed air at elevated pressure and temperature from an aircraft jet engine compressor, a turbine receiving the bleed air, an air-air heat exchanger defining a first air flow path for air to be cooled and a second air flow path for air to pass therethrough and absorb heat from the air to be cooled and apparatus for supplying air from the turbine to the second air flow path at sub-atmospheric pressure.

Additionally in accordance with a preferred embodiment of the present invention there is provided an aircraft air cycle air conditioning system including apparatus for receiving bleed air at elevated pressure and temperature from an aircraft jet engine compressor, precooler apparatus for cooling the received pressurized air, turbine apparatus receiving the pressurized air for being driven thereby and providing expansion thereof, thus lowering the temperature thereof, an air-air heat exchanger lowering the temperature thereof, an air-air heat exchanger defining a first air flow path for air to be cooled and supplied to an aircraft cabin and a second air flow path for air from the turbine apparatus to pass therethrough at sub-atmospheric pressure and absorb heat from the air to be cooled, and compressor apparatus, at least partially driven by the turbine apparatus, for drawing air at sub-atmospheric pressure through the second flow path.

In accordance with a preferred embodiment of the present invention, a portion of the pressurized air downstream of the precooler is supplied to the first air flow path to be cooled and supplied to an enclosure for cooling and pressurization of the enclosure.

Additionally in accordance with a preferred embodiment of the present invention, the pressurized air is further cooled by an intercooler disposed intermediate the precooler and the first air flow path.

According to one embodiment of the invention, the compressor is operative to exhaust air received from the second flow path to the ambient. According to another embodiment of the invention, the compressor is operative to direct air received from the second flow path back through the first flow path. Preferably, the air from the compressor first passes through an intercooler before entering the first flow path.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
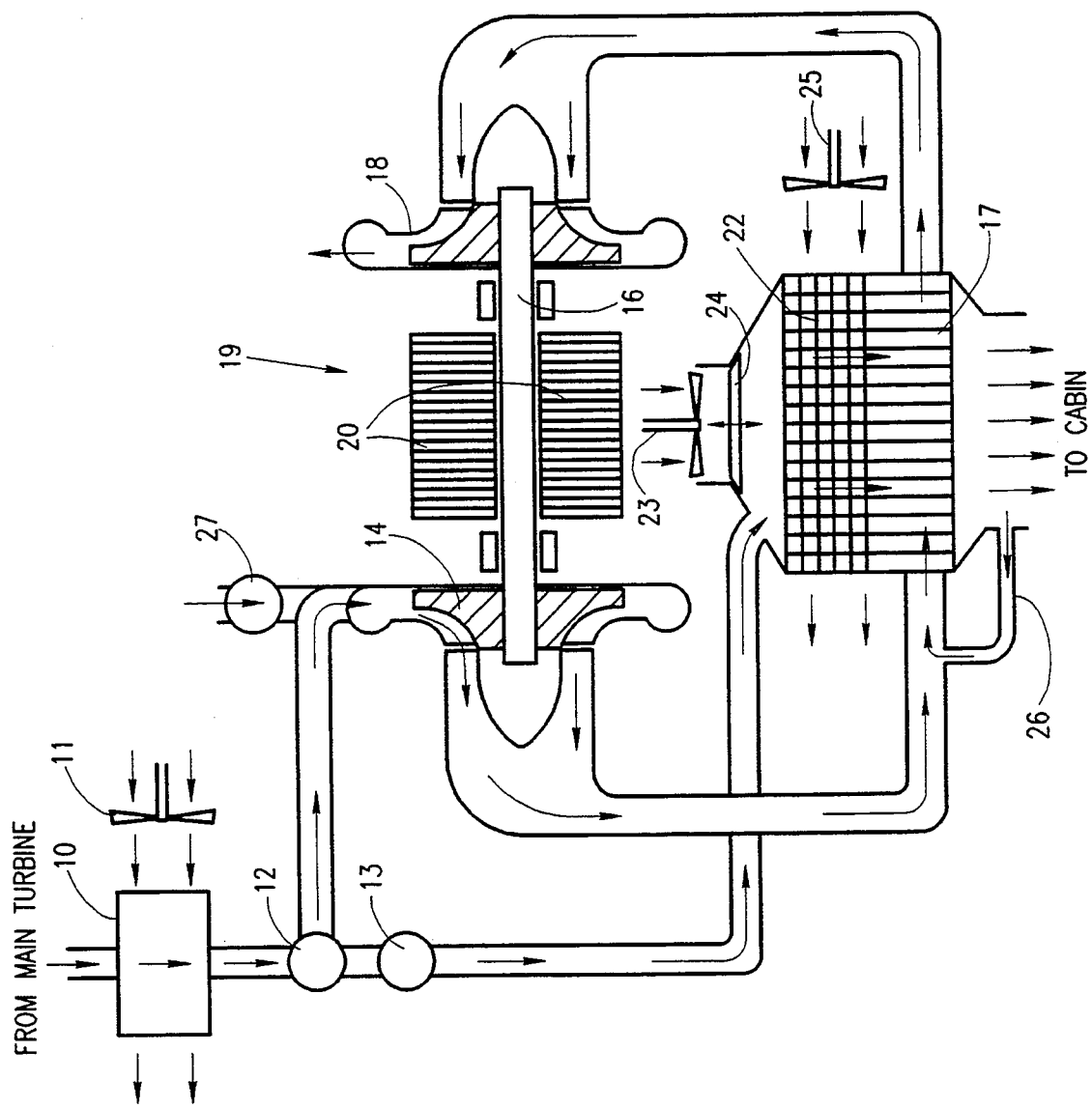
FIG. 1 is a simplified illustration of an air cycle cooling system constructed and operative in accordance with a preferred embodiment of the present invention.

Reference is now made to FIG. 1, which illustrates an air cycle cooling system constructed and operative in accordance with a preferred embodiment of the present invention. The system will be described herein with particular reference to a cooling system for aircraft, it being understood that the invention is not necessarily limited to aircraft applications.

As illustrated in FIG. 1, bleed air from the compressor of a jet engine, typically at a pressure of 25–30 psi or above and a temperature of between 280–450 degrees Fahrenheit, is received by a precooler 10, which typically comprises an air-air heat exchanger which receives a flow of ambient air driven by a fan 11 for cooling of the pressurized air.

The pressurized air passes from the precooler 10 to a pressure regulator 12, which reduces the pressure thereof to a predetermined pressure, such as 26 psi.

From pressure regulator 12 a first flow of pressurized air is supplied to a turbine 14, which may be similar to a turbine of a conventional turbocharger, such as a Garrett Model T04 or a Brown Boveri Model RR151. This flow of pressurized air drives the turbine, producing rotation of a turbine shaft 16 as well as expansion of the pressurized air. The following effects are produced:

a. lowering of the temperature of the air supplied to turbine 14, i.e. typically from a turbine input temperature of 145° F. to 38° F.;
b. lowering of the pressure of the air to sub-atmospheric pressure, typically from a turbine input pressure of 26 psi to an output pressure of 6 psi. This sub-atmospheric pressure is provided by suction produced by a downstream compressor 18, as described hereinbelow; and
c. condensation of part of the water vapor contained in the air supplied to the turbine.

The air at sub-atmospheric pressure from the turbine 14 is supplied to an air-air heat exchanger 17 defining a first air flow path for air to be cooled and a second air flow path for air to pass therethrough and absorb heat from the air to be cooled. The air from the turbine passes through the second air flow path and is heated, thus evaporating any liquid water present therein or injected via a pipe 26.

Air passing through the second air flow path is sucked from the heat exchanger 17 by the operation of compressor 18, which is driven by turbine 14 and as needed, by an integral motor-generator 19, whose rotor is fixed to shaft 16 and whose stator 20 is arranged thereabout. In the embodiment of FIG. 1, the compressor 18 is operative to exhaust the air sucked from the second air flow path to the ambient at a predetermined pressure.

In this embodiment of the invention, pressurization of the cabin at an elevated altitude is realized by employing pressurized air from pressure regulator 12 via a valve 13 supplied to an intercooler 22, which is preferably an air-air heat exchanger cooled by a flow of ambient air, driven by a fan 25. From intercooler 22, the air passes along the first flow path of heat exchanger 17 for cooling thereby and is supplied to an enclosure, such as an aircraft cabin.

For operation on the ground, cabin pressurization is not required. In one mode of ground operation, ambient air is supplied by fan 23 via a normally-closed valve 24 to the first flow path of heat exchanger 17, without requiring the cooling capacity of the intercooler 22 or the operation of fan 25. In this mode of ground operation, valve 13 is closed and thus there is no pressurized air flow from pressure reducer 12 to the heat exchanger 17.

In another mode of ground operation, the jet engine is shut down and thus no bleed air is available. In this case, a normally-closed air inlet valve 27 is opened to permit ambient air to reach the turbine 14. The turbocompressor is driven by electric motor 19 such that compressor 18 produces suction upstream of the turbine 14, thus drawing in ambient air via valve 27. In this mode of operation, cooling is produced using only an external source of electrical energy to power motor 19.

It is a particular feature of the present invention that in view of the sub-atmospheric pressure prevailing in the cold side (second flow path) of the heat exchanger, large quantities of water, tapped from condensation of humidity in the first flow path and supplied via pipe 26, may be evaporated thereat, without saturating the air flow. In view of this high energy absorption capability, the overall cooling efficiency of the heat exchanger 17 is significantly enhanced, thus reducing the cold mass-flow requirement per unit of hot massflow. Accordingly, relatively less energy must be expended in operation of the compressor.

It is also a particular feature of the present invention that the efficient use of pressurized air from the jet engines of an aircraft enables efficient and sufficient cooling of an aircraft cabin to be realized even when the aircraft engines are idling or turned off, as during ground time, thus obviating the need for costly auxiliary airborne or ground based air-conditioning systems.

It is appreciated that when relatively high pressurization levels are provided to the air supplied to the turbine, as during aircraft flight, the motor-generator may actually produce electricity for other uses.

Figure 2:
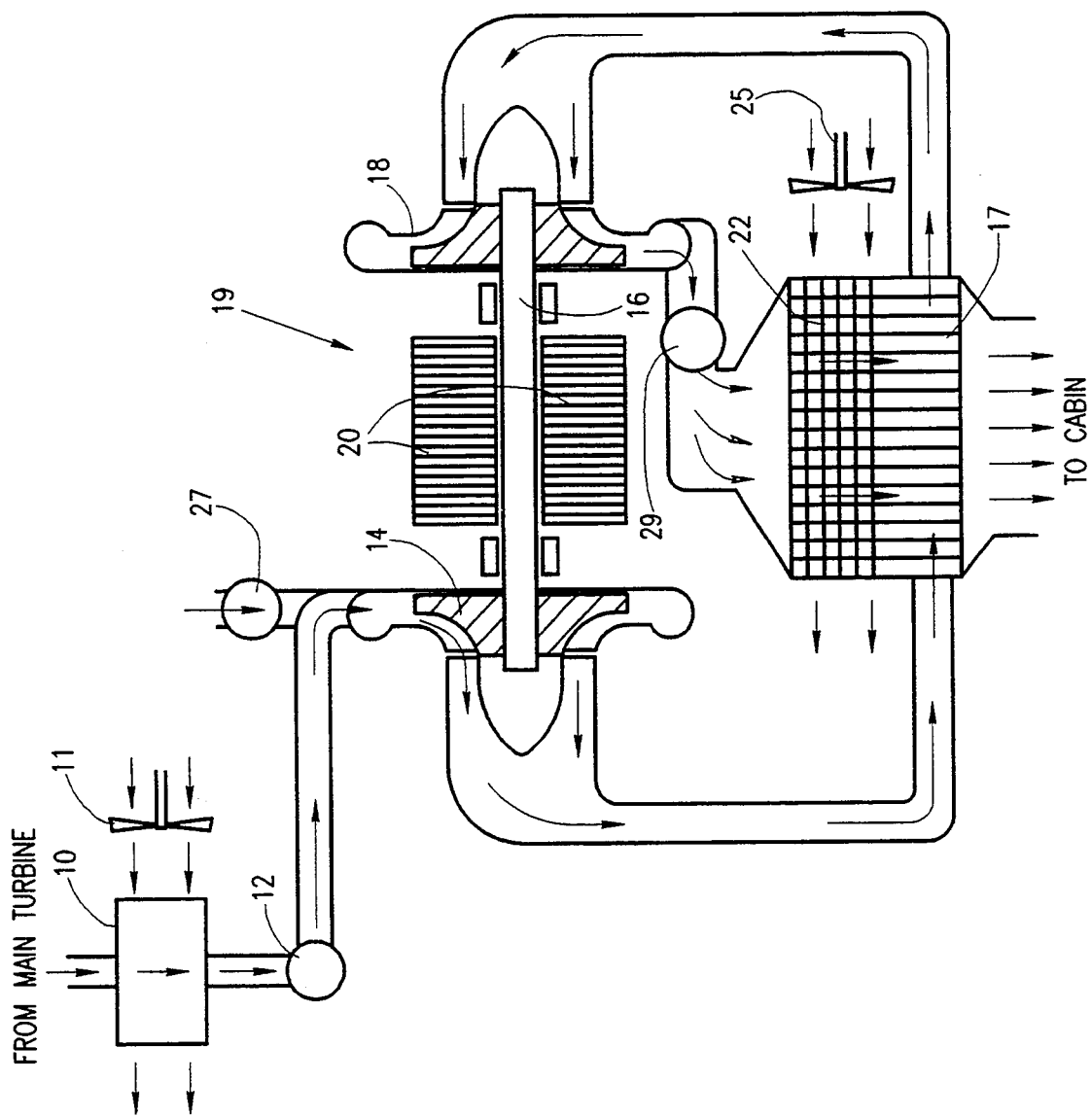
FIG. 2 is a simplified illustration of an air cycle cooling system constructed and operative in accordance with another preferred embodiment of the present invention.

Reference is now made to FIG. 2, which illustrates an alternative embodiment of the invention. For the sake of conciseness and clarity, only the differences between the two embodiments of FIGS. 1 and 2 will be described, the substantially identical features being indicated in both figures by identical reference numerals.

In the embodiment of FIG. 2, no flow of pressurized air is provided from the pressure regulator 12 to the first flow path of the heat exchanger, nor is ambient air supplied thereto via either of normally closed valves 24 and 27. Instead, the first flow path of the heat exchanger receives air only from the output of the compressor 18, and its pressure is calibrated to the required cabin pressure by a valve 29. Thus the bleed air flow is reduced to about 50% of the flow needed in embodiment of FIG. 1, thereby reducing significantly the energy loss from the main turbine.

It will be appreciated by persons skilled in the art that the present invention is not limited by what has been particularly shown and described hereinabove. Rather the scope of the present invention is defined only by the claims which follow:

We claim:
1. An air cycle air conditioning system comprising:
   a precooler for cooling pressurized air;
   a pressure reducer, downstream of the precooler, for reducing the pressure of the pressurized air;
   turbine apparatus receiving the pressurized air, for being driven thereby and providing expansion thereof, thus lowering the temperature thereof;
   an air-air heat exchanger defining a first air flow path for air to be cooled and a second air flow path for the air from the turbine at sub-atmospheric pressure to pass therethrough and absorb heat from the air to be cooled; and
   compressor apparatus, at least partially driven by the turbine apparatus, for drawing air at sub-atmospheric pressure through the second flow path,
   wherein said compressor is operative to direct air received from the second flow path back through the first flow path at a predetermined pressure.
2. An air cycle air conditioning system comprising:
   a precooler for cooling pressurized air;
   a pressure reducer, downstream of the precooler, for reducing the pressure of the pressurized air;
   turbine apparatus receiving the pressurized air, for being driven thereby and providing expansion thereof, thus lowering the temperature thereof;
   an air-air heat exchanger defining a first air flow path for air to be cooled and a second air flow path for the air from the turbine at sub-atmospheric pressure to pass therethrough and absorb heat from the air to be cooled; and
   compressor apparatus, at least partially driven by the turbine apparatus, for drawing air at sub-atmospheric pressure through the second flow path, wherein said compressor is operative to direct air received from the second flow path back through the first flow path at a predetermined pressure and wherein said air from the compressor first passes through an intercooler before entering the first flow path.

3. An air cycle air conditioning method comprising:

precooling pressurized air;

downstream of the precooler, reducing the pressure of the pressurized air;

driving a turbine with the pressurized air thus providing expansion thereof and lowering the temperature thereof;

supplying the air from the turbine at sub-atmospheric pressure to an air-air heat exchanger defining a first air flow path for air to be cooled and a second air flow path for the air at sub-atmospheric pressure to pass through and to absorb heat from the air to be cooled; and using the turbine to at least partially drive a compressor operative for drawing air at sub-atmospheric pressure through the second flow path, wherein said compressor is operative to exhaust air received from the second flow path to the ambient, and wherein said compressor is operative to direct air received from the second flow path back through the first flow path, at a predetermined pressure.

4. An air cycle air conditioning method comprising:

precooling pressurized air;

downstream of the precooler, reducing the pressure of the pressurized air;

driving a turbine with the pressurized air thus providing expansion thereof and lowering the temperature thereof;

supplying the air from the turbine at sub-atmospheric pressure to an air-air heat exchanger defining a first air flow path for air to be cooled and a second air flow path for the air at sub-atmospheric pressure to pass through and to absorb heat from the air to be cooled; and using the turbine to at least partially drive a compressor operative for drawing air at sub-atmospheric pressure through the second flow path, wherein said compressor is operative to exhaust air received from the second flow path to the ambient, wherein said compressor is operative to direct air received from the second flow path back through the first flow path, at a predetermined pressure, and wherein said air from the compressor first passes through an intercooler before entering the first flow path.

* * * * *